United States Patent [19]

Krause et al.

[11] Patent Number: 5,694,121
[45] Date of Patent: Dec. 2, 1997

[54] LATENCY REDUCTION AND ROUTING ARBITRATION FOR NETWORK MESSAGE ROUTERS

[75] Inventors: John C. Krause; William J. Watson; David P. Sonnier, all of Austin, Tex.; Robert W. Horst, Saratoga, Calif.

[73] Assignee: Tandem Computers Incorporated, Cupertino, Calif.

[21] Appl. No.: 469,756

[22] Filed: Jun. 6, 1995

Related U.S. Application Data

[63] Continuation-in-part of Ser. No. 316,431, Sep. 30, 1994, abandoned.

[51] Int. Cl.$^6$ ................................................. H04Q 9/00
[52] U.S. Cl. ................................. 340/825.5; 370/462
[58] Field of Search ........................... 340/825.5, 825.02, 340/825.51; 370/85.6, 85.1, 85.2, 85.3, 414, 418, 444, 447, 455, 461, 462; 395/860, 861, 728, 730, 731, 732

[56] References Cited

U.S. PATENT DOCUMENTS

| | | | |
|---|---|---|---|
| 3,699,524 | 10/1972 | Norberg | 340/825.5 |
| 4,663,756 | 5/1987 | Retterath | 340/825.5 |
| 5,388,097 | 2/1995 | Baugher et al. | 370/85.5 |
| 5,388,228 | 2/1995 | Heath et al. | 395/325 |
| 5,479,158 | 12/1995 | Sato | 340/825.5 |

*Primary Examiner*—Edwin C. Holloway, III
*Attorney, Agent, or Firm*—Townsend and Townsend and Crew LLP

[57] ABSTRACT

A data communicating device, having a number of inputs whereat data is received for communication from one of a number of outputs of the device, includes apparatus for selecting one of the inputs based upon a comparison of accumulated bias values that can change over time when an input is kept waiting. Each input is provided an assigned bias value from which is developed the accumulated bias value that is compared with that of other inputs arbitrating for access to an output. The output selects one of the inputs, based upon the comparison, and the accumulated bias value of the selected input is diminished by the sum of the assigned bias values of the inputs participating in the arbitration, but not selected, while the accumulated bias values of the other participants are each increased by their corresponding assigned bias values. Thereby, numbers of inputs having data destined for the same output will have their chance of gaining access to the output increased the longer they wait; conversely, inputs which do gain access have their chances for immediate subsequent access decreased in favor of allowing other inputs access.

21 Claims, 5 Drawing Sheets

| ARBITRATION PERIOD | (BV=2) INPUT PORT 1 | (BV=1) INPUT PORT 2 | (BV=1) INPUT PORT 3 | (BV=1) INPUT PORT 4 | (BV=3) INPUT PORT 5 |
|---|---|---|---|---|---|
| T-1 | 384 | 384 | 384 | 384 | 384 |
| T | 384 | ⇒384 [-4] | >384 [+1] | 384 | >384 [+3] |
| T+1 | 384 | 380 | >385 [+1] | 384 | ⇒387 [-1] |
| T+2 | 384 | 380 | ⇒386 [-3] | 384 | >386 [+3] |
| T+3 | >384 [+2] | >380 [+1] | 383 | 384 | ⇒389 [-3] |
| T+4 | ⇒386 [-4] | >381 [+1] | 383 | 384 | >386 [+3] |
| T+5 | 382 | >382 [+1] | 383 | 384 | ⇒389 [-1] |
| T+6 | 382 | ⇒383 [-0] | 383 | 384 | 388 |
| T+1 | 382 | 383 | 383 | 384 | 388 |

| ARBITRATION PERIOD | (BV=2) INPUT PORT 1 | (BV=1) INPUT PORT 2 | (BV=1) INPUT PORT 3 | (BV=1) INPUT PORT 4 | (BV=3) INPUT PORT 5 |
|---|---|---|---|---|---|
| T−t | 384 | 384 | 384 | 384 | 384 |
| T | 384 | ⟹384[−4] | >384[+1] | 384 | >384[+3] |
| T+1 | 384 | 380 | >385[+1] | 384 | ⟹387[−1] |
| T+2 | 384 | 380 | ⟹386[−3] | 384 | >386[+3] |
| T+3 | >384[+2] | >380[+1] | 383 | 384 | ⟹389[−3] |
| T+4 | ⟹386[−4] | >381[+1] | 383 | 384 | >386[+3] |
| T+5 | 382 | >382[+1] | 383 | 384 | ⟹389[−1] |
| T+6 | 382 | ⟹383[−0] | 383 | 384 | 388 |
| T+t | 382 | 383 | 383 | 384 | 388 |

| ARBITRATION PERIOD | (BV=2) INPUT PORT 1 | (BV=1) INPUT PORT 2 | (BV=1) INPUT PORT 3 | (BV=3) INPUT PORT 5 |
|---|---|---|---|---|
| T−1 | 384 | 384 | 384 | 384 |
| T | 384 | ⟹384 [−4] | >384 [+1] | >384 [+3] |
| T+1 | 384 | 380 [+1] | >385 [+1] | ⟹387 [−2] |
| T+2 | 384 | 381 [+1] | ⟹386 [−4] | >385 [+3] |
| T+3 | >384 [+2] | >382 [+1] | 382 [+1] | ⟹388 [−4] |
| T+4 | ⟹386 [−5] | >383 [+1] | 383 [+1] | >384 [+3] |
| T+5 | 381 [+2] | >384 [+1] | 384 | ⟹387 [−3] |
| T+6 | 383 [+2] | ⟹385 [−2] | 384 | 384 |
| T+7 | 385 | 383 | 384 | 384 |
| T+1 | 385 | 383 | 384 | 384 |

*FIG. 10.*

LATENCY REDUCTION AND ROUTING ARBITRATION FOR NETWORK MESSAGE ROUTERS

This application is a continuation-in-part of application Ser. No. 08/316,413 filed Sep. 30, 1994, now abandoned.

BACKGROUND OF THE INVENTION

The present invention relates generally to a device for routing message traffic in a communications network. More particularly, the invention relates to a method, and apparatus for implementing that method, to bias the arbitration of two or more inputs of the device that are contending for data communication access to the same output of the device.

As multiprocessing environments grow, the ability to provide data communication between the individual system elements (i.e., processors and peripheral equipment) of the system requires careful thought so as not to inadvertently give a system element unfair access to a communications path or some other shared resource (e.g., a multiple-user bus system) while, at the same time, limiting such access to other system elements.

For example, typical data communication networking configurations often use various network devices (e.g., routers, concentrators, hubs, repeaters, bridges) to route message traffic received at one of a number of inputs of the device to an output from which the message traffic is transmitted. However, message traffic can be received at two or more inputs at the same time bound for the same output, raising the issue of who goes first. Access to the output needs to be arbitrated. Smaller systems (i.e., those with a small number of system elements needing to communicate with one another) may use such classic arbitration techniques as assigning fixed priorities to the inputs, or use "round-robin" processing. In the former, each port input is given a priority to form a hierarchical arbitration scheme. Inputs assigned a higher priority will be given access to an output over inputs vying for that same output with lower assigned priorities. The round-robin technique involves assigning priorities according to a predetermined order among the inputs. As message traffic is received, the priorities change so that the last input granted access to a particular output is then given the lowest priority, and the next input in order now has the highest priority; the remaining inputs will have their priorities similarly changed according to the predetermined order.

Similar techniques may be used in other shared resource environments such as, for example, multiple-user VME bus systems, to allocate access to the bus between connected controllers.

However, as computing systems become more complex, the number of elements that may be communicatively interconnected in that system can significantly increase, requiring the various data communication devices (e.g., routing devices) to be able to service multiple devices through a single input. Also, depending upon the complexity of the system, routing devices may be used to form, for example, tree-like network structures and configurations to route message traffic among the various elements of the system. Using pre-assigned priorities, round-robin processing, or other similar techniques can unfairly allocate the services of a routing device's input to some of the system's elements at the expense of other elements that use another input of that routing device. For example, a routing device may have only one element coupled through one input, but several elements connected through a second input. Using any of the above techniques will operate to give more of the routing device's attention to the one element, and less attention to each of the several elements using the second input. Thus, prior arbitration techniques can unfairly allocate more of the routing device's services to the input having the lesser number of system elements using that input.

SUMMARY OF THE INVENTION

The present invention, in its broadest sense, is directed for use in arbitrating access to any type of shared resource such as, for example, a bus structure shared by multiple users. The invention is described herein in the context of its preferred embodiment in which it is used in a network routing device having multiple message-receiving port inputs and at least one output port wherein message traffic is received at one of the port inputs for transmission from the output port.

Generally, the invention provides each port input with an assigned bias value indicative of that port input's allocation of an output port's services or bandwidth. From the assigned bias value an accumulated bias value is developed and used to arbitrate access to the output port when two or more port inputs have message traffic to be transmitted from that output port. The accumulated bias value will change, depending upon whether the contending port input wins or loses the arbitration. The change is such that losing arbitration will raise the losing port input's ability to win a succeeding arbitration period so that eventually the port input will win arbitration and gain access to the output port. Conversely, a port input that wins arbitration, and thereby access to the output port, will have its arbitrating ability (in the form of its associated accumulated bias value) diminished to give contending ports added capability to gain access.

According to an embodiment of the invention, the accumulated bias value of a port input begins with an offset. (Although an initial value of zero could be used, for reasons explained below, an offset value is used as an initial accumulated bias value.) When an port input participates in arbitration for access to an output port with other port inputs, it is the accumulated bias that dictates which port input wins and which loses arbitration and access to the output port. At the conclusion of the arbitration, one of the port inputs is selected, and the accumulated bias values are modified: the winning port input's accumulated bias value is diminished by the sum of the assigned bias values of the other port inputs that participated in the arbitration; and, conversely, the accumulated bias value of each losing port input is increased by its respective assigned bias value. Thus, the completion of arbitration see the accumulated bias values of the participating port inputs increased (to increase that port input's chances of winning access the next arbitration period), or decreased (to diminish that port's chances of access the next arbitration period).

There are a number of advantages achieved by the present invention. First, by manipulating the bias values used by an port input to arbitrate access to an output port in the manner here taught provides all port inputs of a routing device fair access to the output port that is based upon their assigned bias values. This can become an important feature when a port input of a routing device is obligated to service (route message traffic originating with) a number of system elements as opposed to other port inputs needing to service only one or a few system elements. As will be seen, adjustment of the bias value used to arbitrate access to an output port enhances the chances of waiting message traffic being routed with little delay. At the same time, the possibility of a port input's hogging access to an output port is minimized. Thus, the arbitration scheme of this invention operates to apportion the available bandwidth of that output port among the port inputs on a fair basis according to their assigned bias values. Message traffic at any port input is not kept waiting too long, and latency in routing that message traffic from any system element is reduced.

Second, the invention operates to allocate a minimum guaranteed portion of an output port's maximum available bandwidth to any port input. Higher assigned bias values can be given to tilt access to an output in favor of port inputs that service more system elements than do other port inputs. Similarly, port inputs that are appointed to handle real-time data (e.g., video) can be given assigned bias values that operate to ensure against loss of data resulting from having to wait for other message traffic.

Third, by providing assigned bias values for an entire network, a guaranteed message transmission latency between any two system elements can be established. This allows lower time-out values to be set that will be exceeded only under error conditions, and not due to network congestion. The time-out values can then alert the appropriate agent (e.g., software) to take the necessary action to re-try the operation, or switch to an alternate path.

These and other advantages of the present invention will become evident to those skilled in the art upon a reading of the following detailed description of the invention, which should be taken in conjunction with the accompanying drawings.

DETAILED DESCRIPTION OF THE INVENTION

Figure 1:
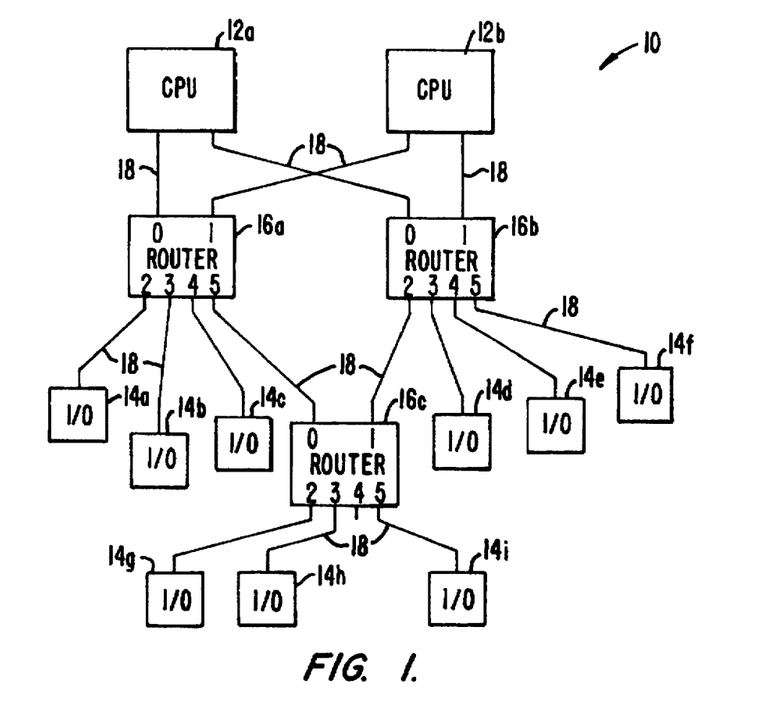
FIG. 1 is a simplified block diagram of a multiple processor system that includes such system elements as central processing units (CPUs) coupled to one another and to a plurality of input/output (I/O) units by a system area network ("SAN") for communicating message traffic therebetween, using routing devices incorporating the present invention.

Turning now to the figures, and for the moment initially FIG. 1, there is illustrated a simplified processing system and designated generally with the reference numeral 10. The processing system 10 is shown, comprising at least a pair of central processing units (CPUS) 12a, 12b, and a plurality of input/output units 14 (14a, 14b, . . . , 14i) interconnected in a system area network configuration by routing devices ("routers") 16 (16a–16c), and hi-directional communication links 18.

Preferably, message traffic between the various elements of the system 10, via the network formed by the routers 16 and links 18, is in the form of messages comprising serially transmitted 9-bit symbols, together with the necessary transmitting clocks for synchronous transfers of the symbols. The symbols are encoded to form either data or commands used for network protocol flow control. Network flow control is not relevant to the understanding or implementation of the present invention and, therefore, is not discussed further herein, except as be necessary to the description of certain of the elements of the routing devices 16. Each message, however, contains data identifying the source and destination of the message. The destination address is used by the routers 16 to select the port output to which the message will be routed for retransmission.

Continuing with FIG. 1, each of the routers 16 has six ports (0, 1, . . . , 5). Each port is bi-directional in that each can receive message and at the same time, transmit message traffic. Accordingly, each port 0, 1, . . . , 5 includes associated input logic (FIG. 3) whereat receive message traffic is handled, and output logic (FIG. 4) which handles transmission of message traffic from the ports. FIG. 1 shows the ports 0–4 of the router 16a each being connect to "service" (i.e., route to an output) messages from only one system element: CPUs 12a, 12b, and I/O devices 14a, 14b, and 14c, respectively. Port 5, on the other hand, is connected so that it can receive message traffic from as many as eight system elements routing through that port: both CPUs 12a, 12b (via routers 16b and 16c), the three I/O units 14g, 14h, 14i (via router 16c), and the three I/O devices 14d, 14e, and 14f (via the routers 16b and 16c). Port 5 of the router 16a, therefore, could conceivably be called upon to service all eight potential sources at the same time, all of which could be requesting to be routed the port output of the same port, e.g. port 0 (to CPU 12A).

In light of the fact that ports 1–4 of the router 16a are connected to service only one system element, whereas port 5 may be called upon to service as many as eight system elements, an arbitration method that grants each port input access to an port output on an equal basis would provide each of the I/O units 14a, 14b, and 14c with more frequent access to, for example, port 0 than that provided, for example, the I/O units 14g, 14h, and 14i. The present invention works to alleviate that problem by biasing port 5 in a manner that will give it more frequent access to port 0 (or any other port) as needed.

Figure 2:
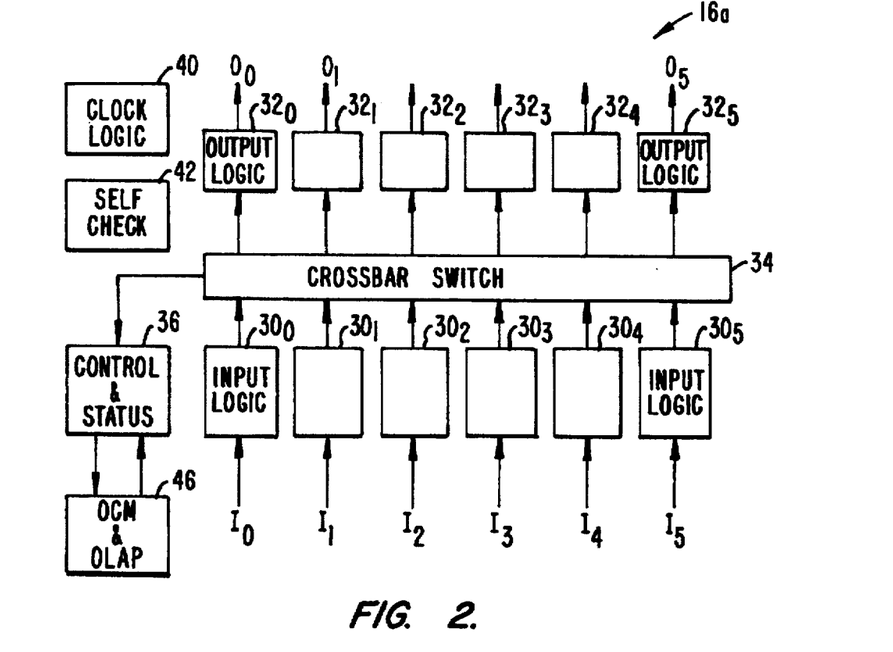
FIG. 2 is a simplified block diagram of a routing device used in the system area network of FIG. 1, illustrating its basic construction, including its multiple ports each having input and output capability whereat message traffic is received and re-transmitted.

Turning now to FIG. 2, a simplified block diagram of the router 16a is illustrated. It will be appreciated that the routers 16b and 16c are structured substantially the same as the router 16a, unless otherwise noted, so that the following description of the router 16a will apply equally to the routers 16b, 16c. Also, the structure and function of the router 16a, and its component parts, are discussed here only to the extent necessary to appreciate and understand the present invention.

As indicated above, each of the ports 0, 1, ..., 5 can receive and/or transmit message traffic. FIG. 2 shows, therefore, the router 16a as having, for each port 0, 1, ..., 5, input logic 30 ($30_0$, $30_1$, ..., $30_5$) for handling receipt of message traffic at the corresponding port, and output logic 32 ($32_0$, $32_1$, ..., $32_5$) for handling message traffic transmission for the port. Message traffic received by one of the ports 0–5 is routed by the associated input logic 30 to one of the output logic 32 as designated by address information contained in the message. That routing is conducted by a crossbar switch 34, controlled in part by control and status logic 36 (as well as the individual output logic 32, as will be discussed further below). Thus, for example, message traffic received at port 0 is applied to the associated input logic $30_0$ and routed to an output logic 32 (e.g., $32_2$) by the crossbar switch 34 according to the destination address contained in the message.

A control and status unit 36 contains the various state machines that provide synchronous control over most of the operation of the router 16a. Additionally, the router 16a includes clock logic 40 for supplying the various clocking signals necessary for synchronous operation and self-check circuitry 42 that for performing certain self-check operations not relevant to the invention herein with one exception: shown in connection with FIG. 7, and described more fully below, is an error check circuit that is used to maintain a check for errors.

The router 16a is equipped with an on-line access port (OLAP) 46 that provides the router with a communication interface to a maintenance processing system (not shown). The OLAP 46 provides the maintenance processing system with access through which the router can receive various operating and control information such as, for example, assigned bias values for each input section, as will be described below. The OLAP 46 connects to a serial bus 48 that is structured in conformance with IEEE Standard 1149.1. Thus, information may be provided the router 16a at start-up, or during ongoing operation. Those skilled in the art will realize that the IEEE Standard 1149.1 is that based upon IEEE 1149.1-1990, May 21, 1990, SH13144, Institute of Electrical and Electronic Engineers, 345 East 47th Street, New York, N.Y. 10017. For the curious, further information as the construction and operation of the OLAP 46 made be had from reference to this standard.

Figure 3:
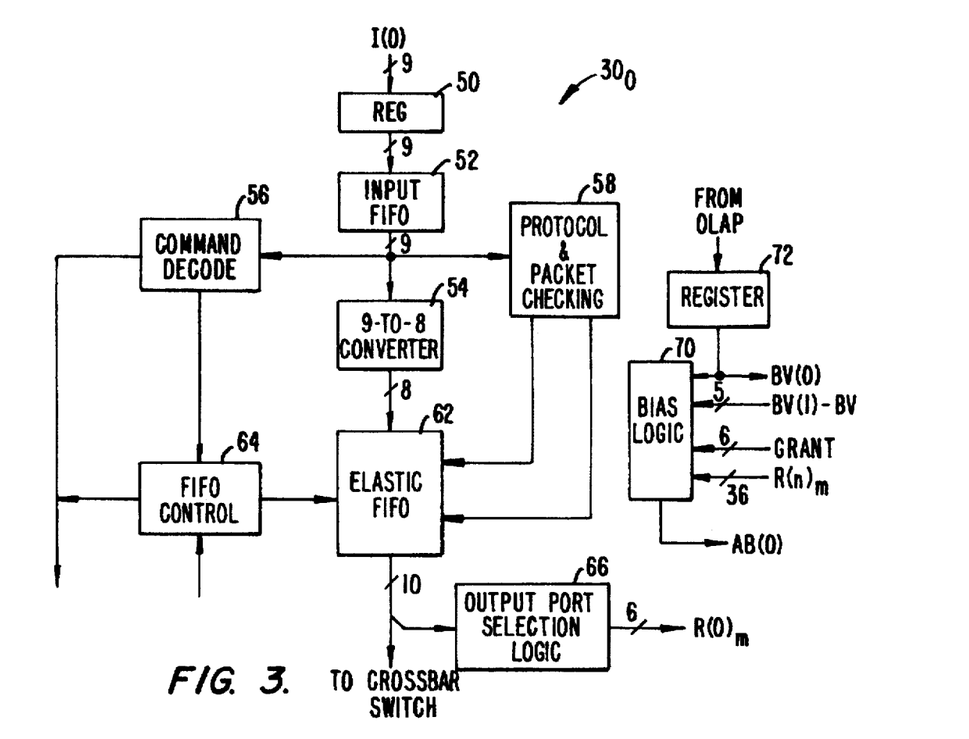
FIG. 3 is a simplified block diagram of the port input logic of one port of the routing device shown in FIG. 2.

FIG. 3 shows a block diagram of the input logic $30_0$ for port 0. The input logic $30_1$, ..., $30_5$ for the other ports 1–5 are of substantially identical construction, and unless noted otherwise the description of the input logic $30_0$ should be taken as a description of the input logic $30_1$, ..., $30_5$.

The input logic $30_0$ is shown as having a pipelined structure, comprising an input register 50 that provides synchronization between the clock signal received with the message from the source and that of the router 16a, an input first-in-first-out buffer queue (FIFO) 52 and an elastic FIFO 62, operating to receive and temporarily store message traffic until it can be routed to the port output indicated by the destination address of the message. Interposed between the input FIFO 52 and the elastic FIFO 62 is a 9-to-8 (bit) converter 54 that converts each 9-bit symbol from its 9-bit encoded form to an 8-bit byte form. A command decode element 56 examines each received symbol to determine if it is a command that requires router action. A protocol and packet checking unit 58 operates to ensure that the message meets certain pre-established transfer protocols, and checks a check sum at the end of the message to ensure that it was transmitted and received properly.

The output of elastic FIFO 62 is applied to the crossbar switch 34 which will route the message to the appropriate output logic $32_0$, $32_1$, ..., $32_5$ when that output logic is available.

Selection of the proper port output from which the message is to be transmitted is determined, as has been indicated, by the destination address contained in the incoming message. That determination is made by the output port selection logic 66 which receives the destination address contained in the incoming message from which it identifies the designated output port by a request signal communicated on one of six request lines $(R(0)_n$, where n=0, 1, ..., 5, and identifies the port output to which the request is to be directed). Each of the six request lines $R(0)_n$ is coupled to a corresponding one of the output logic 32.

Before continuing, a word about the notation used herein to identify signal lines and the signals they carry. As noted above, the output port selection logic 66 of input logic $30_0$ produces six separate Request signals, each carried to a corresponding one of the port outputs 0, ..., 5. All six port inputs produce six such Request signals that, when one is asserted by one or more of the port inputs, identifies that port input as having message traffic to be routed to the port output receiving that asserted Request signal. Thus, a Request signal $R(m)_n$ (m,n=0, 1, ..., 5), indicates that the port output of port m has requested access to the port output of port n. For example, a Request signal from port input of port 3, that is asserted to request, access (routing) to the port output of port 5 is $R(3)_5$; similarly, an asserted request from port input of port 4 for access to port output of port 2 is $R(4)_2$.

As will be discussed in greater detail below, a Request signal is honored by a port output with a responsive GRANT $(m)_n$ signal (m,n=0, 1, ..., 5), indicating that the port output of port m has granted access to the requesting port input of port n.

In generally, then, a signal $S(m)_n$ identifies the source of the signal as element m, and the receiver of the signal as element n. Unless otherwise noted, this terminology will be adhered to in the remainder of this discussion.

The Request signal $R(m)_n$ of each input logic $30_m$ associated with the ports 0–5 is also coupled to each of the other input logic for reasons having to with development of the accumulated bias values of each. It is sufficient here to understand that each input logic 30 will receive six sets of Request signals $R(m)_n$: five from each input logic 30, and those that it develops, to inform the receiving input logic 30 which port inputs may be participating in arbitration for access to which port output at any particular moment in time.

Continuing with FIG. 3, the input logic $30_0$ is shown as including bias logic 70. Bias logic 70 operates to develop an accumulated bias value (AC(m)) from an assigned bias value BY(m) that is provided each of the input logic $30_m$. A register 72 holds the assigned bias value BV(m) for the associated port m. The content of the register 72 is coupled to the bias logic 70. The bias logic 70 also receives the assigned bias values of the other ports. Accordingly, as FIG. 3 illustrates, the input logic $30_0$ receives the assigned bias values from ports 1, 2, ..., 5 (BV(1), BV(2), ..., BV(5)). The bias logic 70 also receives the six Request signals, $R(m)_n$, of each input logic $30_m$, including input logic $30_0$. From this, in a manner described more fully below, the bias logic 70 develops accumulated bias value (AB(0)) for the input logic $30_0$, reflecting, in effect, a period of time that received message traffic has waited for routing to a port output.

Figure 6:
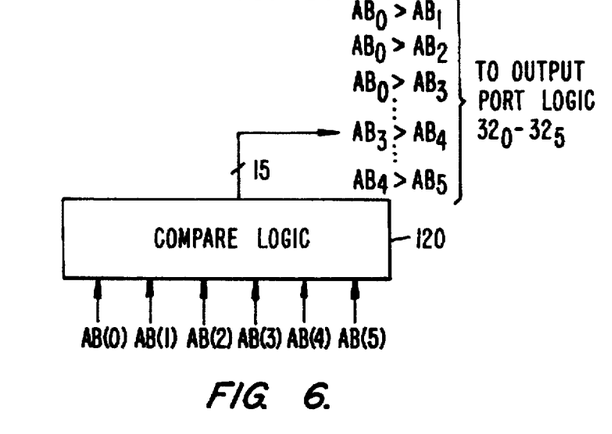
FIG. 6 is an illustration of comparator logic used to determine relative accumulated bias values developed of the port inputs contending for a particular output port.

The accumulated bias value AB(0) so developed serves as the value used by the port input of port 0 when arbitrating for access to a port output with other port inputs. The accumulated bias values AB(m) of all port inputs are conveyed to a compare logic 120 (FIG. 6). Compare logic 120 operates to compare every accumulated bias value with every other accumulated bias value, producing on 15 signal lines all pair-wise comparisons of each of the accumulated bias values. These 15 pair-wise comparison signals are used by the output logic 30 of each port to determine which of two port inputs will be granted the access they are requesting.

Figure 4:
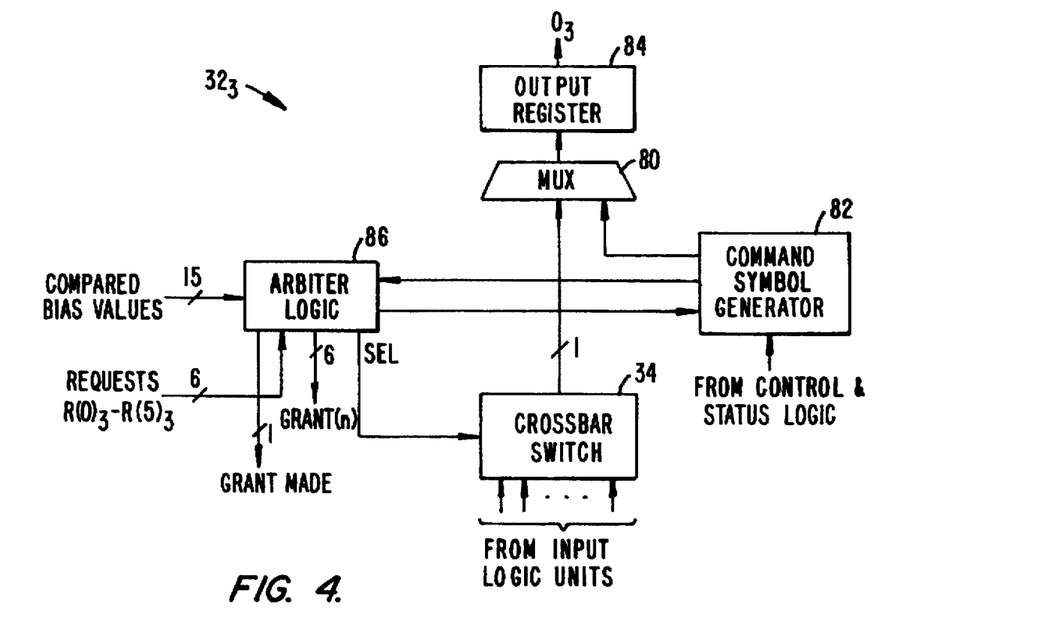
FIG. 4 is a simplified block diagram of the output logic of one port of the routing device of FIG. 2.

FIG. 4 illustrates, in simplified form, the architecture of the output logic $32_3$ for port 3. The output logic 32 for the other ports are of substantially identical construction. A multiplexer (MUX) 50 is shown in FIG. 4 as receiving an output of the crossbar switch 34. (Five other outputs of the crossbar switch 36 are similarly communicated to, and received by corresponding ones of the output logic 32 of the other five ports.) The MUX 80 also receives command symbols from the command symbol generator 82, and therefore operates to select between the message data from the crossbar switch 34 and the command symbols from the command signal generator 82. Periodically, command symbols may need to be inserted and transmitted according to the network protocol being used—under direction and control of the control and status logic 36 (FIG. 2). The selection made by the MUX SO is coupled to an output register 84.

The output logic 323 includes arbiter logic 86 that receives, from the input logic 32 of each port 0–5, the Request signals (R(m)₃), including that from input logic $30_3$ associated with output logic $32_3$ of port 3. (For reasons not relevant here each of the ports 0–5 provides the capability for self-addressed message delivery. It is for this reason that a port input may need to request access to the associated port output.) Additionally, 15 pair-wise comparisons of each of the accumulated bias values produced by the port inputs 30 are communicated from the compare logic 120 (FIG. 6) to each of the six arbiters 86 of the output logic 32m. Each of the arbiters 86, in turn, includes decode circuitry (not shown) of conventional design to decode the received sets of pair-wise comparisons and, together with any asserted Request signals R(m)ₙ, determine (1) which ports are requesting access, and (2) select for access the requesting port input with the highest accumulated bias value. When such selection is made, the arbiter logic 86 will issue, on one of six signal lines (one for each input logic 30), a GRANT(n) signal (n=0, 1, . . . , 5) to the winning port input participating in the arbitration. In addition, the arbiter 86 issues a 3-bit selection signal (SEL) to the crossbar switch 34 to cause the selected input logic 30 to be routed to the output logic $32_3$.

Each port input that participates in arbitration for routing message traffic to a port output will have its associated accumulated bias value modified to reflect the outcome of that arbitration. A port input that wins the arbitration and is granted access will have its accumulated bias value reduced by the sum of the assigned bias values of the other port inputs that also participated in that arbitration. Conversely, the accumulated bias values of the port inputs that participated in that arbitration, but lost, will have their accumulated bias values increased by their assigned bias values. Since it is the accumulated bias value supplied by each port input that is used for arbitration, it can be seen that by decreasing the winning port input's accumulated bias value, while at the same time increasing that of those port inputs losing arbitration, will increase the chances for one of the losing port input to win the next arbitration. The effect of modifying accumulated bias values in this manner is to give each port a guaranteed average service in proportion to its assigned bias value divided by the sum of assigned bias values of all contending ports.

Figure 5:
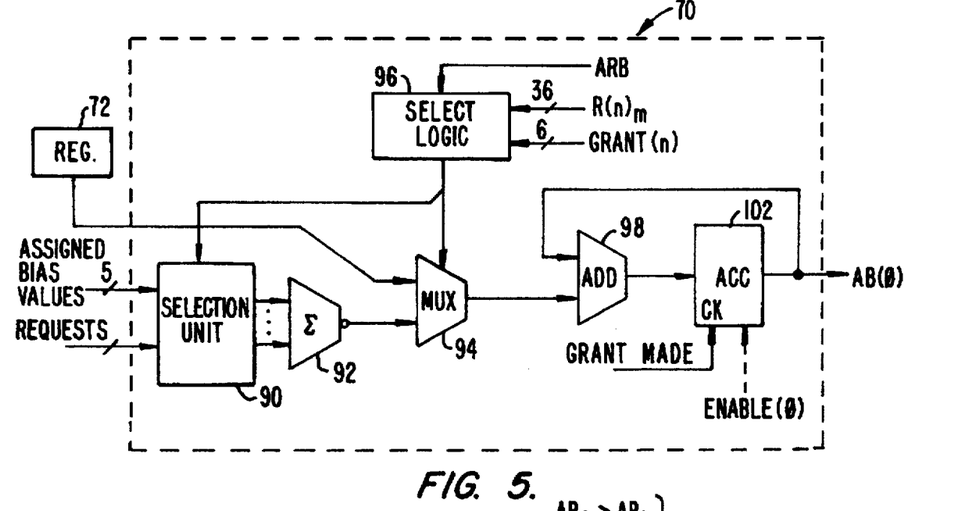
FIG. 5 is a block diagram of the bias logic of the input logic of FIG. 3 that develops an accumulated bias value used for arbitrating access between two or more of the port inputs to one of the port outputs of the routing device of FIG. 2.

The bias logic 70, shown in greater detail in FIG. 5, operates to develop the accumulated bias values for each input logic 30 in accordance with the foregoing. The bias logic 70 includes a selection unit 90 that receives the assigned bias values (BV(0), BV(1), BV(2), BV(4), BV(5)) from the registers 72 of the input port inputs of the other ports 0–2 and 4–5, and the request signals R(m)ₙ, (36 request lines in all), each identifying, when asserted, a request of an input logic $30_m$ for a particular port output from the input logic 30 of all six port inputs. The selection unit 90 is conventional combinatorial logic that uses the request signals to select the assigned bias values of each port participating in an arbitration with the port input of input logic $30_0$ for access to the same output port. That is, if the port input of logic $30_0$ is contending for access to port 3 with ports 4 and 5, only the assigned bias values for ports 4 and 5 (BY(4), BY(5)) are selected.

The assigned bias values of the participating port inputs are accordingly selected by the selection unit 90 and applied to summing logic 92 of conventional design that operates to develop a two's complement of the sum of the selected assigned bias values. The complemented result is passed to a multiplexer (MUX) 94 which operates under control of control logic 96 to select between the complemented result of the summing logic 92, or the assigned bias value of the associated input logic ($30_0$) from register 72. The output of the MUX 94 is applied to one of two operand inputs of an adder 98 which operates to combine the value from the MUX 94 selection with the content of an accumulator register (ACC) 102, storing the result of that combination back to the ACC 102.

The ACC 102 maintains the accumulated bias value AB(0) for the input logic $30_0$ (port 0). The result of the addition performed by the adder circuit 98 is loaded in the ACC 102 with a GRANT MADE signal asserted by the output logic 32 for which the input logic $30_0$ of port 0 was seeking access. The GRANT MADE signal is asserted by the arbiter logic 86 at the conclusion of the arbitration period in which the port 0 was participating. If port 0 won arbitration and was selected for access to the port output for which it was contending, the MUX 94 will select the two's complement of the sum of the selected assigned bias values of those ports also in contention. The selected value is added to the then content of the ACC 102 when GRANT MADE is asserted. Since it is a two's complement of a sum, the effect is to reduce the prior value held by the ACC 102. Conversely, if participation of port 0 was to no avail, the MUX 94 selects the content of register 72, and the content of the ACC 102 is increased by the assigned bias value of port 0 to develop the accumulated bias value that will be used by port 0 in the next successive arbitration period.

The control logic 96 also receives an arbitration (ARB) signal that signifies that an arbitration cycle is being conducted. At the same time, control logic 96 receives the request signal R(0)ₘ from port 0, and compares that request with the GRANT(n) signals issued by the output logic 32 for which port 0 is contending to determine if port 0 won or lost arbitration. Based upon that determination, the control logic 96 will cause the MUX 94 to make the selection that will either increase or decrease the content of the ACC 102 as described above.

The assigned bias values ascribed the individual ports can be any value. However, as hereinbefore indicated, it is believed that a more fair arbitration may result from assigned bias values that represent the number of system elements (e.g., I/O units 14, CPUs 12) that may send message traffic to the particular port. For example, and referring for the moment to FIG. 1, the assigned bias value for port inputs 0, 1, 2, 3, and 4 may each be "1" to signify that each of these ports will receive, as an input, message traffic from only one system element (i.e., I/O units 14 for each of the ports 2–4, and the CPUs 12a, 12b for each of the ports 0–1, respectively). On the other hand, the assigned bias value for port input 5 must be higher to provide fair arbitration for the number of system elements that could conceivably send message traffic to that port for routing by the router 16a. Thus, the assigned bias value for port 5 could be a value of 8 to account for the extra system elements it may route.

In order to avoid having to deal with negative numbers for the accumulated bias values, the ACC 102 for each port is initially preset with some positive value. Here, the ACC 102 is 10 bits in width, although it can be seen that other widths are possible, and is initially preset with a binary value equal to 384 (decimal). This initial preset is then changed over time by the addition of the assigned bias value for the particular port, or the subtraction of the sum of the assigned bias values of those input section seeking access to the same output logic of a port.

With these concepts, and the architecture of the invention as described above, in mind an example of the operation of the invention may improve its understanding and appreciation. Referring again to the figures, and for the moment primarily to FIGS. 1, 4, and 5, assume that each of the three I/O units 14g, 14h, and 14i respectively coupled to the ports 2, 3, and 5 of the router 16c develop messages for transmission to the CPU 12a via the router 16a, and that no other system elements connected to the router 16c need to transmit messages. (Router 16c must arbitrate between the port inputs 2, 3, and 5, but in this example, is assumed that no other ports of the router 16c see message traffic, so that the router 16c will supply the messages from the three I/0 units to the port 5 of the router 16a one after the other.) Assume further that when the first of the three message from the router 16c is received at the port 5 of the router 16a, message traffic is also received at the ports 2 and 3 of router 16a from the I/0 units 14a and 14b—also destined for the CPU 12a.

Figure 8:
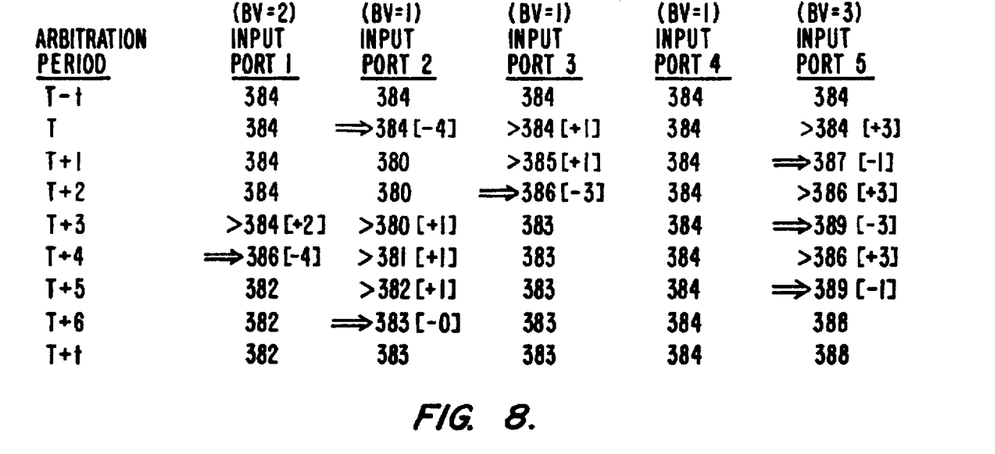
FIG. 8 is a diagram illustrating arbitration conducted between message-receiving port inputs of the routing device shown in FIG. 2, and showing the adjustment of accumulated bias values for the arbitrating port inputs, depending upon whether an port input is granted or not granted access to the output port for which is was contending.

Thus, router 16a sees incoming message traffic at ports 2, 3, and 5 all destined for port 0 from which it will be transmitted to CPU 12a. This message traffic must be arbitrated, and FIG. 8 illustrates that arbitration. In FIG. 8 each column shows the accumulated bias values for ports 1–5, as maintained by the corresponding ACC 102, for specified arbitration periods (T-t, T, T+1, etc.) shown in the left-most column. The assigned bias value for each of the ports 1–5 is parenthetically shown above each column. (In order to obtain a more illustrative arbitration sequence, the assigned bias for port 5 is, for this example, 3, rather than 8; Also, port 0 is not represented in FIG. 8 for clarity.) Those ports participating in arbitration (i.e., have waiting incoming message traffic) during any particular arbitration period are indicated in FIG. 8 by the right-facing carrots (>) to the immediate left of that port's accumulated bias value. Those ports that win arbitration in any arbitration period are indicated by the darker accumulated bias values and the right-facing arrows (==>) to the immediate left of the winning accumulated bias value. The changes to the accumulated bias values are shown in brackets to the immediate left of the bias values of participating ports. These are the changes that will be effected to the bias values immediately after participation in an arbitration period: increases to the bias value of a port (or ports) that participate in an arbitration and lose; a decrease to the bias value of a port winning arbitration.

As FIG. 8 also illustrates, it is further assumed that the router 16a has handled no message traffic since initialization so that the accumulated bias values of each of the ports 1–5 is equal to the initialization bias values of 384. Thus, at some time after arbitration period T-t the ports 2, 3, and 5 each receive, and have waiting message traffic bound for transmission through port 0. The first arbitration period T, will see the accumulated bias values of the participating ports all equal. In the case of ties, such as here, arbitration results in using a pre-assigned priority. Assuming that the pre-assigned priority provides port 1 with the highest priority, then port 2, and so on to port 5 (the lowest priority), then arbitration period T will see port 2 as winning arbitration, and being granted access to port 0.

The conclusion of the arbitration period T results in the accumulated bias value for port 2 being diminished by the sum of the assigned bias values of the other ports that were in contention for port 0: port 3 (assigned bias value of 1) and port 5 (assigned bias value of 3). Thus, the original accumulated bias value 384 for port 2 drops by 4 to 380. At the same time, those contending ports (ports 3 and 5) that lost the arbitration will have their accumulated bias values increased by their assigned bias values. The accumulated bias value for port 3, therefore, is increased by 1 to 385, and that of port 5 by 3 to 387. The port(s) not participating in arbitration see no change in their accumulated bias values so that the accumulated bias values of ports 1 and 4 remain at 384.

The next arbitration period, T+1, sees message traffic still waiting at ports 3 and 5, and since the accumulated bias value of port 5 (387) is greater than that of port 3 (385), port 5 wins arbitration, gaining access to the port 0 to communicate the first of its three waiting messages. (Ports 1–2 and 4, having no waiting message traffic, do not participate in the arbitration.) As before, the winning port, port 5, has its accumulated bias value diminished by the assigned bias values of the other ports also in contention, and the accumulated bias value of the losing port increased. Accordingly, the accumulated bias value for port 5 (the winning port) drops by 1 to 386, and that of port 3 (the losing port) is increased to 386.

The next arbitration period, T+2, sees a tie between the ports 3 and 5: both have accumulated bias values of 386. Therefore, the pre-assigned priority resorted to, resulting in port 3 winning the arbitration, and port 5 losing. Their accumulated bias values are modified, becoming 383 and 389, respectively.

Now, continuing with this example, assume that at some time after the arbitration period T+2, but before the arbitration period T+3, message traffic is received at ports 1 and 2. Port 5 still has two messages waiting to be routed to port 0 (and CPU 12a). The arbitration period T+3, consequently, sees ports 1, 2, and 5 vying for port 0, with their respective accumulated bias values of 384, 380, and 389. Port 5 wins, and ports 1 and 2 lose, resulting in accumulated bias values of 386 (an increase of 2) for port 1, 381 (an increase of 1) for port 2, and 386 (a decrease of 2+1 or 3) for port 5. The next arbitration period, T+4, again sees a tie between the contending ports 1 and 5, and resort to the pre-assigned priority scheme grants access to port 1. The accumulated bias values for the ports contending for access during the arbitration period T+4 changes to 382 (386-(3+1) for port 1), 382 (381+1 for port 2), and 389 (386+3 for port 5). The arbitration period T+5 sees port 5 gaining access for the last of the three waiting messages, and again the accumulated bias values change.

Finally, assuming no further message traffic is received by the router 16a, the arbitration period T+6 has the port 2 arbitrating only with itself, so that at the completion of that arbitration period its accumulated bias value remains at 383 (383-0). Since none of the other ports contended for access for port 0, their respective accumulated bias values do not change.

It should be mentioned that should a port (e.g., port 5) receive message traffic during arbitration period T+6 bound for a port other than port 0 (e.g., port 4), the port 5 will enter the next arbitration period for that port (4) with the accumulated bias value it was left with after the three messages it routed to port 0. Similarly, if port 5 then receives yet another message, now for port 0, it will return and arbitrate with whatever accumulated bias value it had at the completion of the last arbitration cycle port 5 was involved in (to gain access to route a message).

Figure 7:
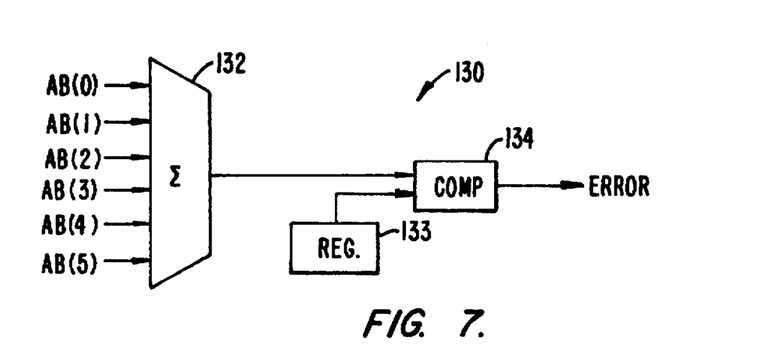
FIG. 7 illustrates error-check logic used to maintain an on-going check for proper operation of the arbiter logic shown in FIG. 4.

Referring now to FIG. 7, there is illustrated an error check circuit for use with the present invention. It may have been noticed by those skilled in this art that the process of increasing or decreasing the individual accumulated bias values as described above will result in no change in the overall sum of the accumulated bias values. Thus, after each change in accumulated bias values as a result of arbitration, the sum of the six accumulated bias values will remain the value it was before such change. This forms the basis for maintaining a check for proper operation of the bias logic 70 for all port input logic $30_0$, $30_1$, ..., $30_5$: if the accumulated bias values are summed, and compared to a constant equal to that expected sum, any deviation will be an indication of an error. FIG. 7 illustrates the error-check circuit 130 implementing this concept. A summing circuit 132 of conventional design receives the six accumulated bias values AB(0), AB(1), ... AB(5) from the input logic 30 of ports 0–5, sums them, and communicates that sum to a compare circuit 134. The compare circuit 134 also receives a constant value (6×384 or 2304) from a register 133, comparing that constant value to the sum received from the summing circuit 132. Any deviation of the sum from the constant value will result in an ERROR signal being asserted, which is coupled to the control and status logic 36 (FIG. 2) where it is acted upon, such as communicating the fact of the error to the maintenance processing system (not shown) via the OLAP 46.

The above described implementation of the invention may result in momentary unfairly biasing input sections when the accumulated bias of a port reaches a large value, a grant is issued, and the port, lacking further incoming message traffic for the moment, drops out of further arbitration, retaining whatever accumulated bias value it may have then developed. When subsequent message traffic is received, this particular port may return to the arbitration process with an unusually large accumulated bias value. Alternatively, a port may win arbitration, and have a large value subtracted from its accumulated bias value, and then go dormant until message traffic is subsequently received. When that port subsequently receives message traffic, it will need to wait for it accumulated bias value to recover by participating in arbitrations until its accumulated bias value is increased to the point where it can hope to compete for access for an output. Both situations tend to operate to unfairly bias a port input.

An example of this is seen in FIG. 8. At the conclusion of the arbitration period T the accumulated bias value of the winning port, port 2, is decreased to a value below the offset (384) to 380. Since, as FIG. 8 indicates, port 2 did not have waiting message traffic for transmission through port 0 (or any other port), its accumulated bias value AB(2) remains at 380 for the next immediately successive arbitration periods T+1, T+2, and T+3.

Figure 9:
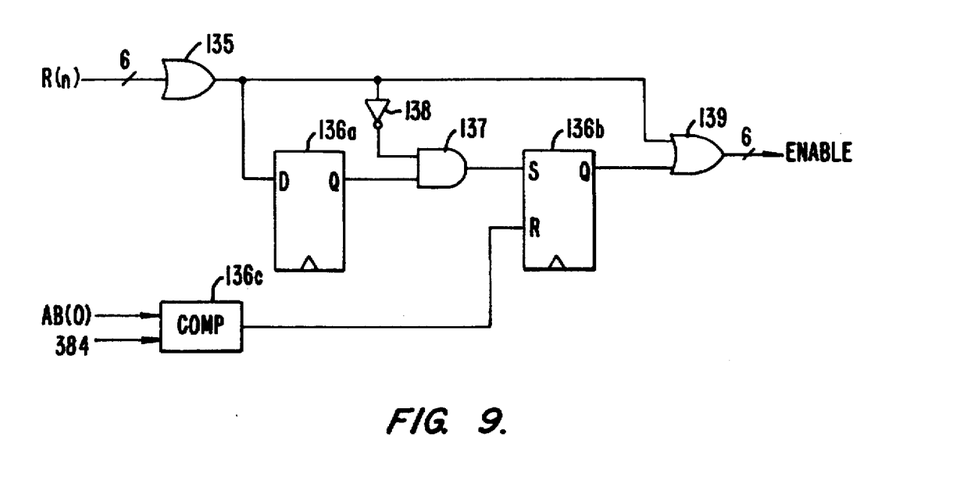
FIG. 9 is an illustration of a modification of the invention used to delay disablement of a port input from participating in adjustment of its associated accumulated bias value until that value reaches a predetermined range of an initial bias value.

In order to alleviate this possible situation, an alternate embodiment of the invention, shown in FIG. 9, is provided in which the adjustments of a participating port's accumulated bias value will not end when it drops out of arbitration process for lack of incoming message traffic. Rather, the accumulated bias of that input section will continue to participate in adjustments until the accumulated bias value of that port diminishes to a range of the bias initialization value, 384.

Thus, shown in FIG. 9 is a circuit for implementing disabled delay, comprising two flip-flops 136a, 136b. As shown, the flip-flop 136a is a D-type flip-flop, receiving a its data (D) input the Request signal developed by Oring the six request signals from the output port selection logic 66 (FIG. 3). The output (Q) of the flip-flop 136a is applied to one of two inputs of an AND gate 137. The second input receives an inverted (by INVERTOR 138) version of an output signal developed by the OR gate 135 from the six port request signals $R_0$, $R_1$, ..., $R_5$ produce by the output logic 66 (FIG. 3). The output of the AND gate 137 is applied to the set (S) input of the (set/reset-type) flip-flop 136b. The (true) output (Q) of the flip-flop 136b is applied to an OR gate 139 that provides a ENABLE(n) signal that is applied to the ACC 102 to cause the input section ($30_n$) to continue participate in adjustments to its accumulated bias value, regardless of whether or not it has incoming message traffic awaiting access to an output section.

A comparator 136c receives the accumulated bias value contained in the ACC 102 (FIG. 5) of the input section (e.g., input section I(0)), comparing it to the initialization value: 384. The output of the comparator 136c is applied to the reset (R) input of the flip-flop 136b. Thus, when Request and the output of the comparator 136c are not asserted (i.e., no incoming message traffic awaiting access to an output section, and the accumulated bias value is not within some margin of 384), the OR gate 139 will pass the output (Q) of the flip-flop 136b to cause the port input to continue participation in the adjustment process, just as if it had message traffic to pass on to an output section. The accumulated bias value of the input section will continue to be increased by the sum of the other input sections still participating in the arbitration or adjustment process. When the accumulated bias value reaches or exceeds the initialization value, 384, the comparator 136c will assert a signal that, when applied to the reset (R) input of the flip-flop 136b, will reset that flip-flop. The Q output of the flip-flop 136 goes LOW, and the output of the OR gate 139 will be deasserted, terminating the input section's participation in further adjustments to its accumulated bias value—until a Request is again generated.

Figure 10:
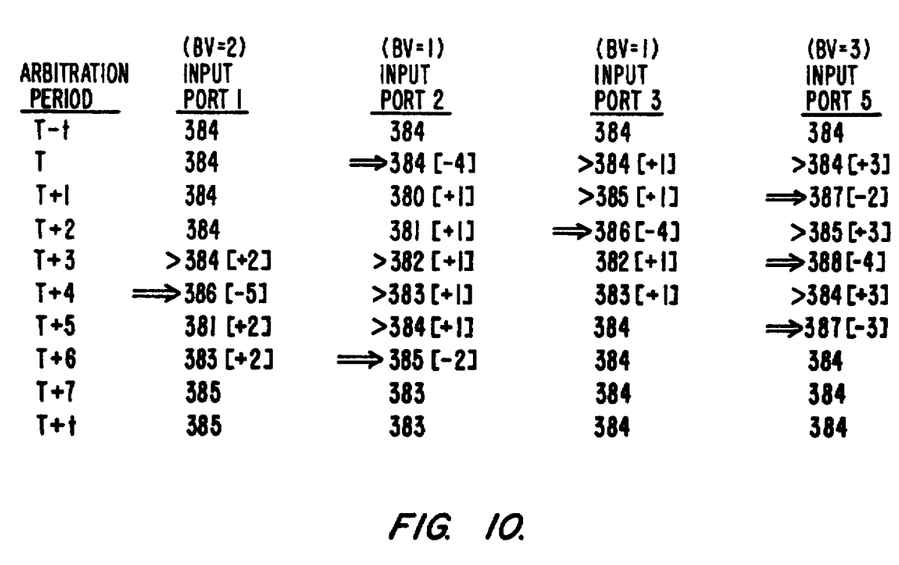
FIG. 10 is a diagram illustrating operation of the delay disablement of FIG. 9.

FIG. 10 illustrates operation of the delayed disabling circuit of FIG. 9. FIG. 10 is, in effect, FIG. 8, revised to show delaying disablement of a port input no longer having waiting message traffic to continue its participation in the adjustment that follows an arbitration until its accumulated bias value is in an acceptable range of the offset (384); or, until new message traffic is presented at the port input. The structure and representations used in FIG. 8 are continued in FIG. 10, among them: each row corresponds to an arbitration period, with the right-facing carrots identifying the port inputs participating in arbitration, and the right-facing arrows identifying the winner. For clarity, ports 0 and 4, which are assumed to be inactive during the time period represented by FIG. 10, are not shown.

Referring then to FIG. 10, arbitration period T sees, as before, ports 2, 3, and 5 arbitrating for access to port 0, and port 2 winning that arbitration. Immediately after arbitration the accumulated bias values of the ports participating in the arbitration are adjusted: the accumulated bias values of the losing ports, ports 3 and 5, are increased by their corresponding assigned bias values (BV(3)=1, BV(5)=3); and, the accumulated bias value of port 2 (AB(2)=384) is decreased by the sum of the assigned bias values of the other ports that participated in the arbitration. Thus, the accumulated bias values for ports 3 and 5 are increased from 384 to 385 (for port 3) and 387 (for port 5). The accumulated bias value for the port 2, on the other hand, is decreased to 380.

The next arbitration period T+1 assumes that port 2 no longer has waiting message traffic. Even so, at the conclusion of that arbitration period, when the winning port (5) has its accumulated bias value decreased, and the other contending, but losing, port (3) has its accumulated bias value increased, the non-contending port 2 will also have its accumulated bias value increased by its assigned bias value from 380 to 381. Port 2, therefore, even though it has no message traffic to route, continues to participate in arbitration in order to raise its accumulated bias value back to the initialization value of 384. That participation extends to the use of its assigned bias value in decreasing the accumulated bias value of the winning port. Thus, at the conclusion of the arbitration period T+1, when the accumulated bias value of port 2 (AC(2)=380) in increased from 380 to 381, its assigned bias value is summed with any other participating ports (i.e., port 3) to decrease the accumulated bias value of the winning port, port 5, from 387 to 385.

Similarly, the conclusion of the next arbitration period, T+2, will see the accumulated bias value for port 2 again increased (from 381 to 382), even though it did not have waiting message traffic; the increase was due to the fact that its accumulated bias value was still outside an acceptable range of the offset. Also, the assigned bias value for port 2 (AC(2)=1) is included in the calculation of the new accumulated bias value for the winning port, port 3, reducing that value from 386 to 382.

The next successive arbitration period (T+3) is entered by port 2 with waiting message traffic for passage through port 0; and, even though the accumulated bias value for port 2 has not yet reached or exceeded the offset, port 2 will still arbitrate with its lower value (382). Even so, this is better than entering arbitration with the accumulated bias value port 2 was left with when it won arbitration for the arbitration period T. In addition, the conclusion of arbitration period (T+2) leaves the accumulated bias value of the port that won that period's arbitration, port 3, with a value reduced below the initialization value of 384. Thus, even though port 3 has no waiting message traffic, it will participate in the arbitration period of (T+3) so that its accumulated bias value will be increased, and its assigned bias value will add to the amount by which the accumulated bias value of the port winning that period's arbitration will be decreased.

A similar situation as that discussed above is seen at the conclusion of the arbitration period T+4 in which ports 1, 2, 3 and 5 participate. Port 3 participates, even though it has no waiting message traffic to be router; it does have an accumulated bias value below the initialization value of 384. Port 1 wins arbitration, and as a result has its accumulated bias value decreased by the sum of the assigned bias values of the losing ports (2 and 5) and port 3 from 386 to 381. Assuming the port input of port 1 receives no further message traffic, which assumption is indicated in FIG. 10, the accumulated bias value (BY(1)) for port 1 will be increased following each of the immediately succeeding arbitration periods (T+5 and T+6) until the accumulated bias value reaches or, as here, exceeds the value of the offset.

Note that at the conclusion of the arbitration periods the accumulated bias values for the participating ports are nearer their initialization values (384) than without use of this scheme—which is exhibited by the arbitrations shown in FIG. 8. Note also that the sum of all accumulated bias values remains constant.

To recap: the described implementation of the invention provides each input section with an accumulated bias value. Those input sections contending for access to an output section will have their associated accumulated bias values changed in a manner that improves the chances of those input section still having incoming message traffic awaiting access to the output section. Those input sections that lose arbitration for a grant of access will have their associated accumulated bias values increased by an assigned bias value; the input sections that arbitrate and gain access will have their accumulated bias values diminished by the sum of the assigned bias values associated with the other input sections that were in contention for access.

While a full and complete disclosure of the invention has been made, it will be obvious now to those skilled in this art that various modifications and alterations can be made. For example, although the invention has been described in the context of a routing device having six (input/output) ports, it will be evident that any other number of ports may be used. Also, in certain applications involving minimal biasing, the size of the accumulator 102 used in the bias logic 70 can be changed. Further still, although the invention is described here with an the offset of 384, other offset values can be used, depending upon the particular environment with which the invention is chosen for use.

Finally, the invention has been described using a design that has only one bias logic per input. However the teachings of the present invention are not so limited. It will be apparent to those skilled in this art that other implementations of the invention whereby each port input would include redundant bias logic units—one for each port output. Alternatively, the bias logic for each input could be implemented using a microprocessor system to calculate the accumulated bias value for the associated port input based upon the particular output for which the port input is contending. Or, equivalently, a specially designed state machine can be incorporated for each port input to select or create bias values according to the desired output port. In addition, those skilled in this art will recognize that the range of accumulated bias values depends upon how many elements will need to be serviced by any one port input as opposed to other port inputs. Thus, that range may need to be larger than discussed here to provide the appropriate bandwidth distributions with the desired granularity. For example, the ACC 102 may need to have a range of 0–999 (decimal), and the preset value be 1000.

We claim:

1. A method for biasing each of a plurality of port inputs for participation in an arbitration for data communication access to an output port of a data communication device, comprising the steps of:

providing each of the plurality of port inputs with an initial bias value;

forming from the initial bias value an arbitration value for each of the port inputs;

comparing the arbitration value of each of the port inputs participating in the arbitration to select a one of the port inputs for data communication access to the output port;

subtracting the sum of the initial bias values of the other of the plurality of port inputs participating in the arbitration from the arbitration value of the one of the plurality of port inputs to form a new arbitration value for the one port input; and adding to the arbitration value of each of the other of the plurality of port inputs participating in the arbitration the corresponding initial bias value to form a new arbitration value for each of said other of the plurality of port inputs.

2. A method of selecting a one of a plurality of data-receiving inputs arbitrating to communicate data to a data communicating medium, comprising the steps of:

providing each of the plurality of data-receiving inputs with an assigned bias value;

forming an accumulated arbitration value for each of the plurality of data-receiving inputs from the assigned value of such data-receiving input;

selecting the one of the plurality of data-receiving inputs on the basis of comparison of the corresponding accumulated arbitration values of the plurality of the data-receiving inputs;

for each one of the plurality of data-receiving inputs, increasing the accumulated arbitration value with the corresponding assigned bias value when an arbitration is denied;

decreasing the corresponding accumulated arbitration value of the one of the plurality of data-receiving inputs with the sum of the assigned bias values of the other of the plurality of data-receiving inputs when an arbitration is won.

3. The method of claim 2, including the step of comparing the accumulated arbitration values of the plurality of data-receiving inputs to select the one of the plurality of data-receiving inputs having the greater accumulated arbitration value.

4. A method for selecting a one of a plurality of data-receiving inputs of a data communicating device arbitrating to communicate data to an output of the data communicating device, the apparatus comprising:

temporarily providing each of the plurality of data-receiving inputs with a bias value;

developing, for each of the plurality of data-receiving inputs, an accumulated value from the corresponding bias value;

comparing the accumulated bias values of the plurality of data-receiving inputs to select the one of the plurality of data-receiving inputs;

for each one of the plurality of data-receiving inputs, increasing the accumulated arbitration value with the corresponding bias value when an arbitration is denied;

decreasing the accumulated arbitration value of the one of the plurality of data-receiving inputs with the sum of the bias values of the other of the plurality of data-receiving inputs.

5. The method of claim 4, wherein the bias value for at least a first one of the plurality of data-receiving inputs is different from the bias value of a second one of the data-receiving inputs.

6. The method of claim 4, wherein the bias values for each of the plurality of data-receiving inputs are equal to one another.

7. In a data communication device having at least a pair of inputs and an output, the device operating to receive message data at the pair of inputs for communication to the output, a method for biasing arbitration between the pair of inputs contending for access to the output, including the steps of:

associating with each of the pair of inputs an assigned bias value and an accumulated bias value;

comparing the accumulated bias values of the pair of inputs to select a one of the pair of inputs for communication to the output;

modifying the accumulated bias value of the one of the pair of inputs, using the assigned bias value associated with the other of the pair of inputs, in a manner that diminishes its capability to be selected for communication to the output in a next arbitration in for communication to the output in which the one of the pair of ports participates; and modifying the accumulated bias value of the other of the pair of inputs in a manner that augments its capability to be selected for communication to the output in the next arbitration.

8. The method of claim 7, wherein the modifying of the accumulated bias value of the one of pair of inputs includes subtracting the assigned bias value of the other of the pair of inputs from the accumulated bias value of the one of the pair of inputs.

9. The method of claim 8, wherein the step of modifying the accumulated bias value of the other of the pair of inputs includes adding the assigned bias value of said other of the pair of inputs to the accumulated value.

10. The method of claim 8, including the steps of producing a sum from the accumulated bias values from the pair of inputs, and comparing the sum to a constant to produce an error signal when the sum is not within a predetermined range of the constant.

11. The method of claim 10, including providing each of the pair of inputs with an initial accumulated bias value, and wherein the constant is equal to a sum of the accumulated bias values.

12. Apparatus for biasing arbitration of each of a number of port inputs for participation in arbitrating for data communication access to an output port of a data communication device, the apparatus comprising:

each of the number of port inputs including temporary storage retaining a predetermined value, and first logic forming from the predetermined value an arbitration value for such port input;

compare logic to compare the arbitration values of each of the number of the port inputs arbitrating for data communication access to the output port to select a one of the port inputs for such data communication access; and each of the number of port inputs further including arithmetic logic to subtract the predetermined values of the other of the number of port inputs arbitrating for data communication access from the arbitration value of the one of the number of port inputs to form a new arbitration value for the one port input, and to add to the arbitration value of each of the other of the number of port inputs arbitrating for data communication access the corresponding predetermined value to form a new arbitration value for each of said other of the number of port inputs.

13. The apparatus of claim 12, including:

a summing circuit connected to receive and produce a sum of the accumulated arbitration values from each of the number of port inputs; and a compare circuit coupled to receive and compare the sum to a constant value to produce an error signal when the sum and the constant value are not equal.

14. Apparatus for arbitrating selection of one of a number of data elements contending for data communication, comprising:

each of the data elements including,
(i) first storage for retaining an initial bias value,
(ii) second storage for retaining an accumulated bias value, and
(iii) arithmetic logic coupled to the first storage of each of the data elements;

compare logic coupled to receive the accumulated bias value of each of the data elements to select a one of the data elements for data communication;

wherein the arithmetic logic operates in response to the compare logic to add the initial bias value to the accumulated bias value of each of the data elements not selected for data communication, and to subtract the sum of the initial bias values of the data elements not selected for data communication from the accumulated bias value of the one of the data elements selected for data communication.

15. A method for biasing each of a plurality of port inputs for an arbitration for data communication access to an output port of a data communication device, comprising the steps of:

providing each of the plurality of port inputs with an initial bias value;

forming from the initial bias value an arbitration value for each of the port inputs;

comparing the arbitration value of each of the port inputs to select a first one of the port inputs for data communication access to the output port;

forming a new arbitration value from the arbitration value of the first one of the plurality of port inputs participating in the arbitration, using the initial bias value of at least a second of the other of the plurality of port inputs participating in the arbitration, the new arbitration value being such as to make it less likely that said first one port input will be selected for data communication access to the output port in a succeeding arbitration for data communication access.

16. The method of claim 15, wherein the modifying step includes subtracting the initial bias value of each of the other of the plurality of port inputs from the arbitration value of the one first one of the plurality of port inputs to form the new arbitration value.

17. The method of claim 15, wherein the step of forming the new arbitration value includes the step of subtracting the initial bias value of each of the other of the plurality of port inputs participating in the arbitration from the arbitration value of the one first one of the plurality of port inputs to form the new arbitration value.

18. The method of claim 15, wherein the step of forming a new arbitration value includes the step of subtracting the initial bias value of the second one of the plurality of port inputs from the arbitration value of the first one of the port inputs to produce the new arbitration value.

19. The method of claim 18, including the step of modifying the arbitration value of the second one of the plurality of port inputs to farm for said second one port input a another new arbitration value that makes it more likely that said second one port input will be selected for data communication access to the output port in a subsequent arbitration for data communication access.

20. The method of claim 19, wherein the modifying step uses the initial bias value of said second one port input.

21. The method of claim 19, wherein the modifying step includes adding the initial bias value of the first one of the plurality of port inputs to the arbitration value of the second one of the plurality of port inputs.

* * * * *